252-185.31 $$$ SR
4/5/83 XR T.102,905

United States Defensive Publication [19] (H) [11] T102,905
Kibbel, Jr. [43] Apr. 5, 1983

[54] CONTROL OF SULFIDES IN AQUEOUS SYSTEMS

[76] Inventor: William H. Kibbel, Jr., 24 Dublin Rd., Pennington, N.J. 08534

[21] Appl. No.: 308,625

[22] Filed: Oct. 5, 1981

[51] Int. Cl.[3] ..... A01N 00/00
[52] U.S. Cl. ..... 210/759; 252/186.31

[57] ABSTRACT

Solid peroxygens may be compressed into shaped forms with or without additives to regulate the dissolving rate of the forms. Use of such peroxygen forms provides a simple and inexpensive method to dispense active oxygen and an alkali into a solution over a predetermined time to oxidize sulfides to sulfates and thus to reduce the chemical oxygen demand. Sodium carbonate peroxide and sodium perborate are two commercial peroxygen compounds particularly useful for this application as they provide both the active oxygen to oxidize the sulfide, and the alkalinity required to raise the pH of the solution to pH 8 or greater, thus preventing the formation of elemental sulfur. In addition, the two compounds are compatible with additives, such as carboxymethylcellulose and methylcellulose, which are useful in regulating the dissolution rate, as well as soda ash, which can be used to provide additional alkalinity.

10 Claims, No Sheets Drawing,
10 Pages Specification

The file of this unexamined application may be inspected and copies thereof may be purchased (849 O.G. 1221, Apr. 9, 1968).